United States Patent
Kikuchi

(10) Patent No.: US 9,628,768 B2
(45) Date of Patent: Apr. 18, 2017

(54) IMAGE PROCESSING APPARATUS, IMAGE CAPTURING APPARATUS, IMAGE CORRECTION METHOD, AND STORAGE MEDIUM

(71) Applicant: Taro Kikuchi, Tokyo (JP)

(72) Inventor: Taro Kikuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 81 days.

(21) Appl. No.: 14/619,298

(22) Filed: Feb. 11, 2015

(65) Prior Publication Data
US 2015/0244915 A1     Aug. 27, 2015

(30) Foreign Application Priority Data

Feb. 21, 2014  (JP) ................. 2014-031770

(51) Int. Cl.
| | |
|---|---|
| *H04N 9/73* | (2006.01) |
| *H04N 5/265* | (2006.01) |
| *H04N 5/14* | (2006.01) |
| *G06T 7/20* | (2006.01) |
| *H04N 5/232* | (2006.01) |
| *H04N 5/235* | (2006.01) |

(52) U.S. Cl.
CPC .......... *H04N 9/735* (2013.01); *G06T 7/2053* (2013.01); *H04N 5/144* (2013.01); *H04N 5/2355* (2013.01); *H04N 5/23251* (2013.01); *H04N 5/265* (2013.01)

(58) Field of Classification Search
None
See application file for complete search history.

(56) References Cited

U.S. PATENT DOCUMENTS

| | | | | |
|---|---|---|---|---|
| 2003/0025822 A1* | 2/2003 | Shimada | ............... | H04N 9/735 348/370 |
| 2005/0206965 A1* | 9/2005 | Nakayama | ............... | H04N 1/56 358/453 |
| 2006/0171605 A1* | 8/2006 | Watanabe | ............... | G06T 5/009 382/274 |

(Continued)

FOREIGN PATENT DOCUMENTS

| | | |
|---|---|---|
| JP | 2002-271638 | 9/2002 |
| JP | 2010-213213 | 9/2010 |

(Continued)

*Primary Examiner* — Timothy J Henn
(74) *Attorney, Agent, or Firm* — Oblon, McClelland, Maier & Neustadt, L.L.P.

(57) ABSTRACT

An image processing apparatus useable for correcting an image includes an input unit to receive an input of an image; an area dividing unit to divide the image, input to the input unit, into a plurality of areas having different lighting conditions; a computing unit to compute a correction coefficient for each of the divided areas divided by the area dividing unit; a movement detector to detect a movement between the first image and the second image supplied from the input unit along the time line; a boundary determination unit to determine a boundary between the areas to which correction coefficients of each of the areas are blended based on the movement detected by the movement detector; and a setting unit to set image correction coefficient data for the image input to the input unit based on the boundary between the areas determined by the boundary determination unit.

20 Claims, 13 Drawing Sheets

(56) References Cited

U.S. PATENT DOCUMENTS

| | | | |
|---|---|---|---|
| 2007/0165960 A1* | 7/2007 | Yamada | H04N 9/735 382/254 |
| 2008/0211925 A1* | 9/2008 | Misawa | H04N 9/735 348/223.1 |
| 2009/0231632 A1 | 9/2009 | Kikuchi | |
| 2010/0098330 A1* | 4/2010 | Finlayson | G06T 5/50 382/164 |
| 2010/0231746 A1* | 9/2010 | Nomura | H04N 9/735 348/223.1 |
| 2013/0162688 A1 | 6/2013 | Matsuoka et al. | |
| 2013/0169607 A1 | 7/2013 | Inukai et al. | |
| 2015/0029357 A1* | 1/2015 | Hamalainen | G02B 7/36 348/223.1 |

FOREIGN PATENT DOCUMENTS

| | | |
|---|---|---|
| JP | 2012-019293 | 1/2012 |
| JP | 2012-235377 | 11/2012 |

* cited by examiner

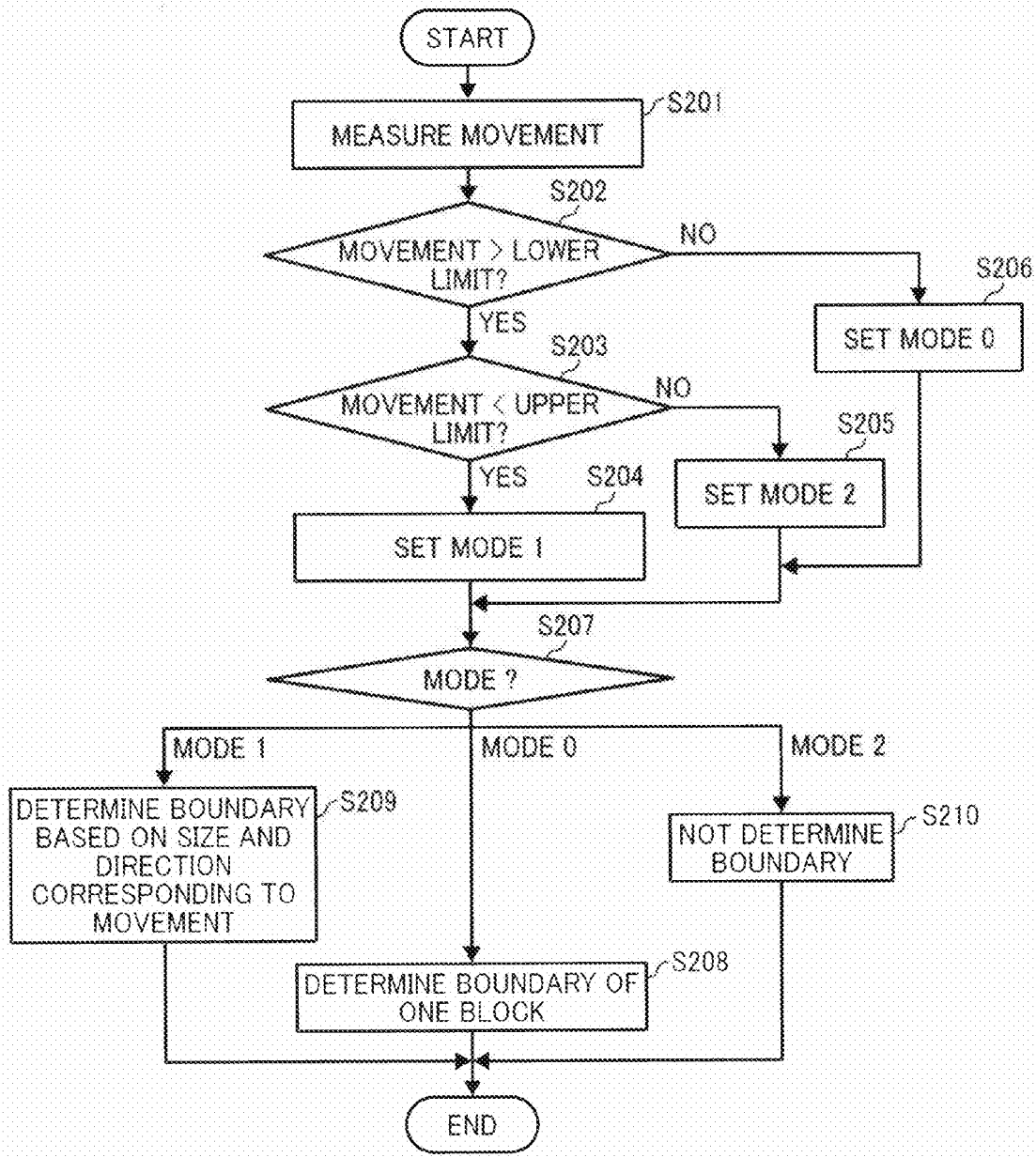

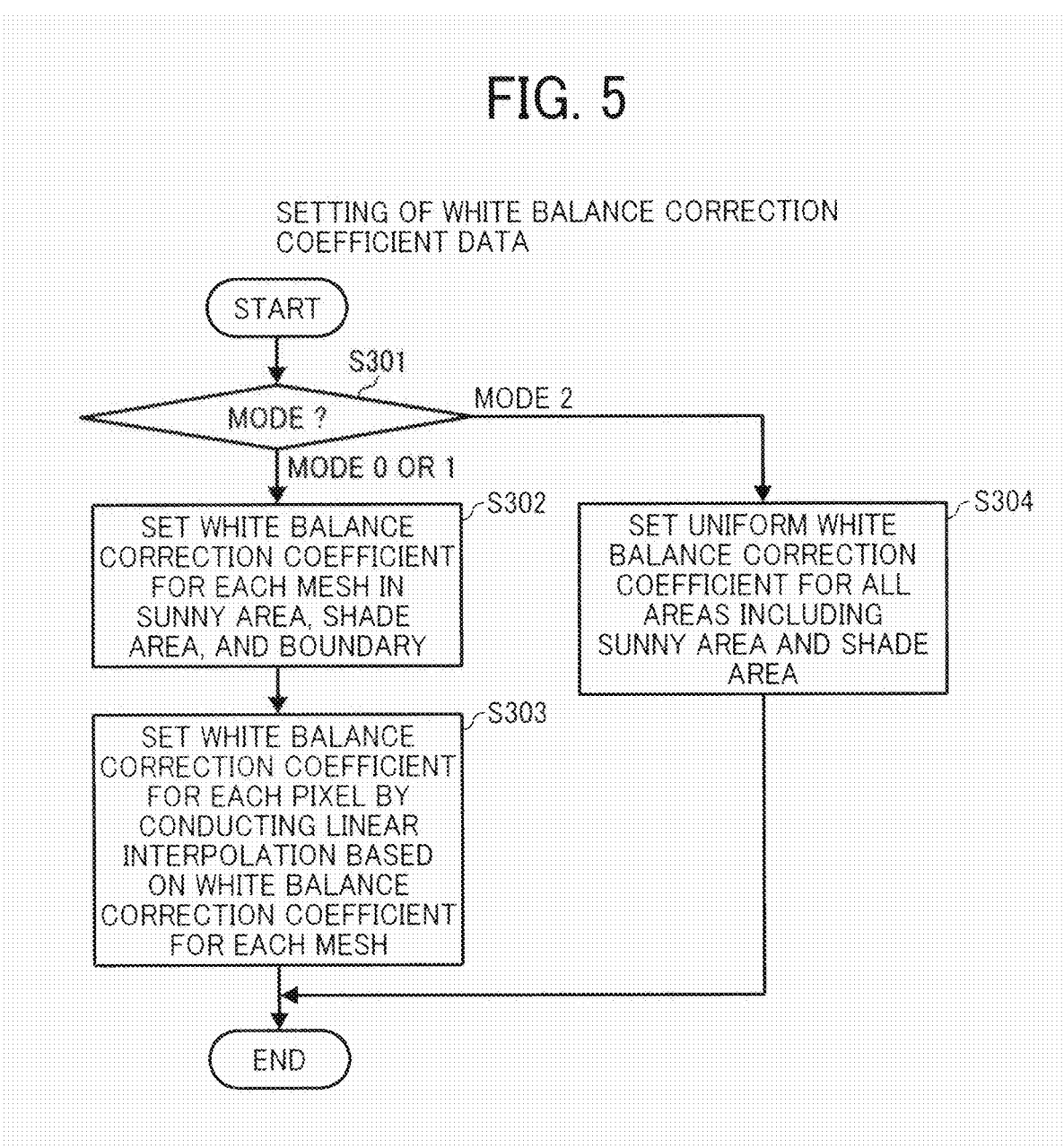

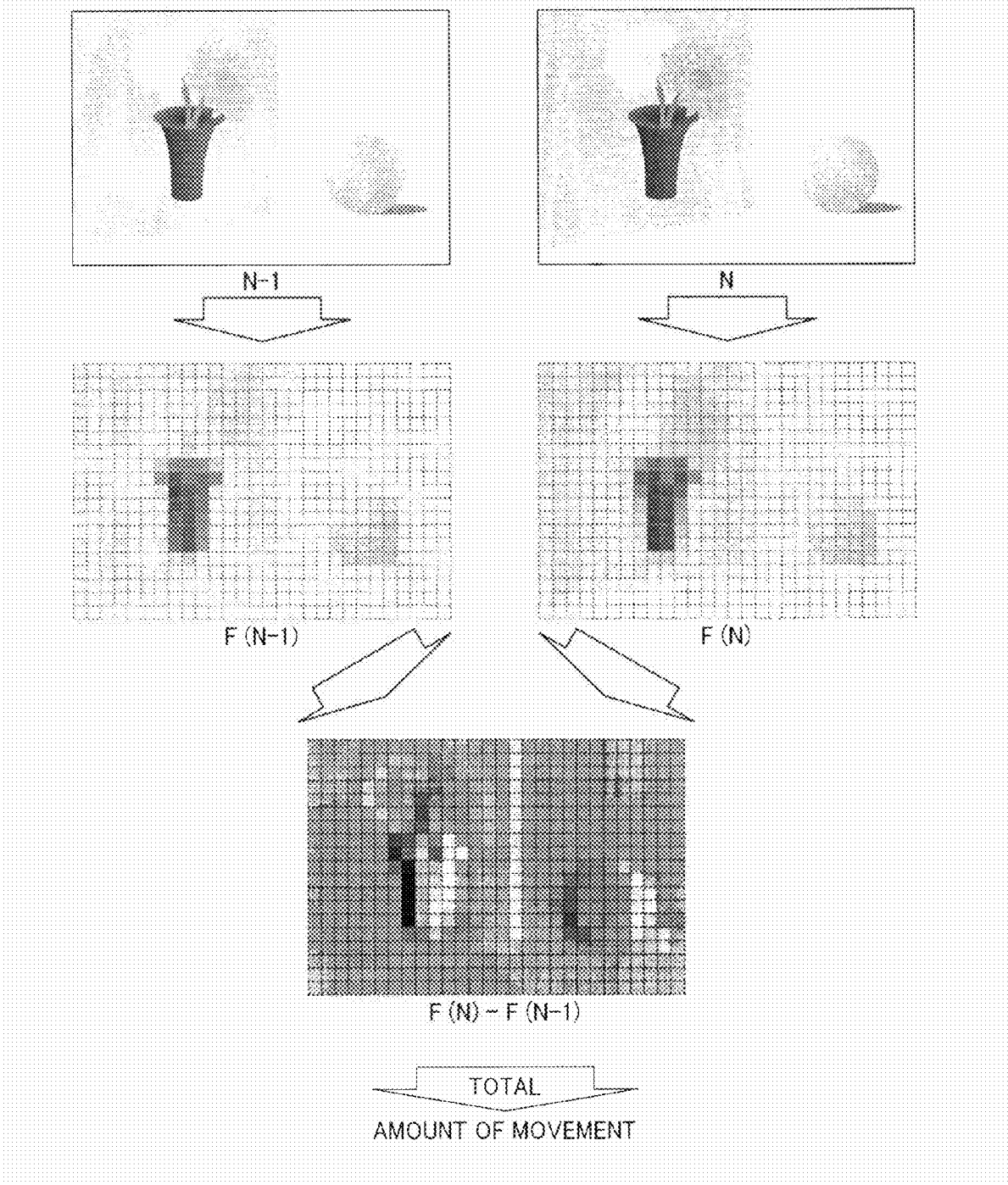

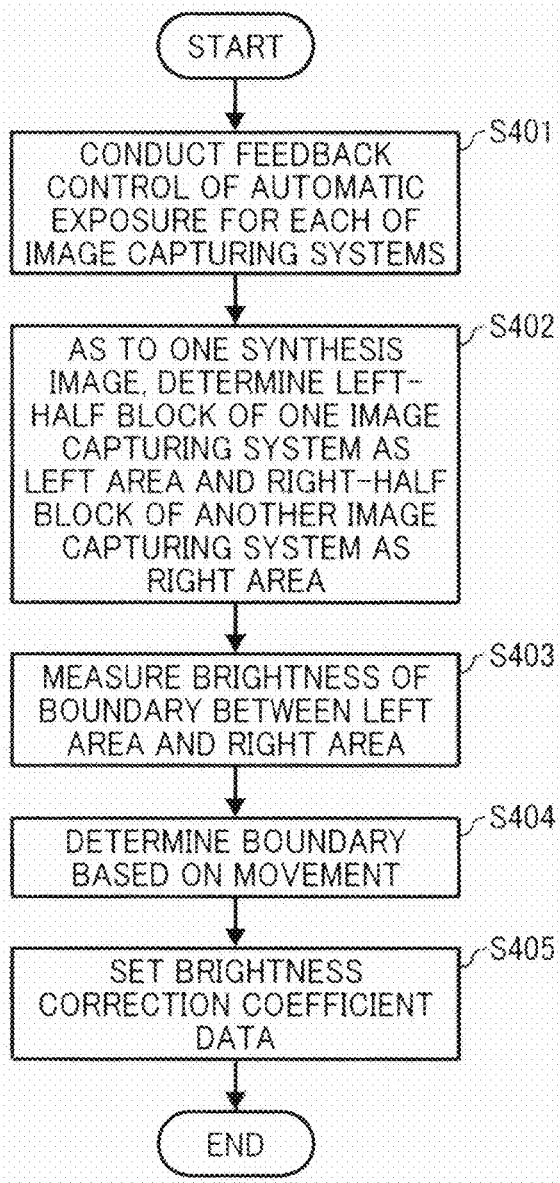

IMAGE PROCESSING APPARATUS, IMAGE CAPTURING APPARATUS, IMAGE CORRECTION METHOD, AND STORAGE MEDIUM

CROSS-REFERENCE TO RELATED APPLICATION

This application claims priority pursuant to 35 U.S.C. §119(a) to Japanese Patent Application No. 2014-031770, filed on Feb. 21, 2014 in the Japan Patent Office, the disclosure of which are incorporated by reference herein in their entirety.

BACKGROUND

Technical Field

The present invention relates to an image processing apparatus, an image capturing apparatus, an image correction method, and a storage medium for conducting an image correction to an image including a plurality of areas having different color temperature and brightness.

Background Art

As to conventional digital cameras, when images are captured, the images may include a plurality of irradiated areas having different color temperature due to different lighting conditions such as different types of light sources, and the captured images can be divided into different areas such as a shade area and a sunny area to conduct a suitable white balance correction for each of areas having different color temperature.

SUMMARY

In one aspect of the present invention, an image processing apparatus useable for correcting an image is devised. The image processing apparatus includes an input unit to receive an input of an image; an area dividing unit to divide the image, input to the input unit, into a plurality of areas having different lighting conditions; a computing unit to compute a correction coefficient for each of the divided areas divided by the area dividing unit; a movement detector to detect a movement between the first image and the second image supplied from the input unit along the time line; a boundary determination unit to determine a boundary between the areas to which correction coefficients of each of the areas are blended based on the movement detected by the movement detector; and a setting unit to set image correction coefficient data for the image input to the input unit based on the boundary between the areas determined by the boundary determination unit.

In another aspect of the present invention, a method of correcting images by using an image processing apparatus is devised. The method includes the steps of dividing an image input to the image processing apparatus into a plurality of areas having different lighting conditions; computing a correction coefficient for each of the divided areas divided by the dividing step; detecting a movement between a first image and a second image supplied along the time line; determining a boundary between the areas to which correction coefficients of each of the areas are blended based on the movement detected by the detecting step; and setting image correction coefficient data for the input image based on the boundary between the areas determined by the determining step.

In another aspect of the present invention, a non-transitory computer-readable storage medium storing a program that, when executed by a computer having a processing circuitry, causes the computer to execute a method of correcting an image by using an image processing apparatus is devised. The method includes the steps of receiving an input of an image; dividing an image input to the image processing apparatus into a plurality of areas having different lighting conditions; computing a correction coefficient for each of the divided areas divided by the dividing step; detecting a movement between a first image and a second image supplied along the time line; determining a boundary between the areas to which correction coefficients of each of the areas are blended based on the movement detected by the detecting step; and setting image correction coefficient data for the input image based on the boundary between the areas determined by the determining step.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a flowchart showing the steps of a determination process of a boundary of a sunny area and a shade area based on a movement in an image conductable by an area boundary determination unit according to a first example embodiment;

FIG. 5 is a flowchart showing the steps of computing and setting white balance correction coefficient for each pixel conductable by a correction coefficient setting unit according to a first example embodiment.

FIG. 9 are schematic views illustrating a process of a detecting a movement based on an image processing

FIG. 12 is a flowchart showing the steps of a process of brightness correction conductable by a signal processor according to the second example embodiment;

Figure 1:
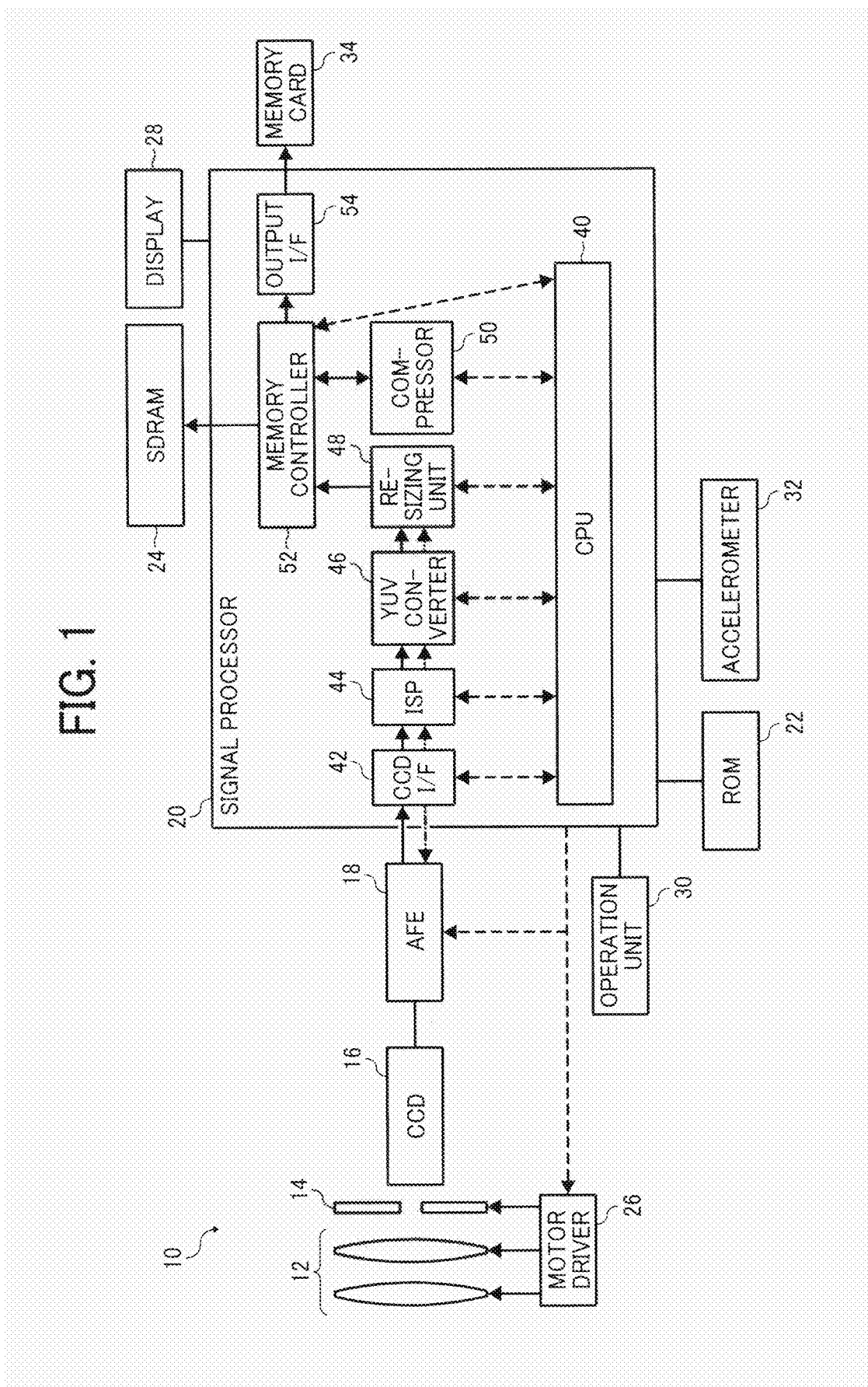
FIG. 1 is a block diagram of a system configuration of an image capturing apparatus according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, apparatus or system according to one or more example embodiments are described hereinafter.

In the following first example embodiment, an image processing apparatus such as an image capturing apparatus 10 is described as an apparatus that captures an image of an object, and outputs an image after conducting white balance correction to the captured image.

(System Configuration of Image Capturing Apparatus)

A description is given of a configuration of a system configuration of an image capturing apparatus 10 according to a first example embodiment with reference to FIG. 1. The image capturing apparatus 10 is, for example, a digital camera. As illustrated in FIG. 1, the image capturing apparatus 10 includes, for example, a charge coupled device (CCD) 16, an analog front end (AFE) 18, a signal processor 20, a read only memory (ROM) 22, a synchronous dynamic random access memory (SDRAM) 24, a motor driver 26, a display 28, an operation unit 30, and an accelerometer 32.

An image of an object passes through a lens unit 12 of a lens barrel enters the CCD 16, and is then formed on a light receiving face of the CCD 16, which is an example of an image capturing element. As to the CCD 16, a RGB original color filter is disposed on a plurality of pixels configuring a solid image capturing element, with which analog RGB image signals corresponding to RGB (three original colors) are output, wherein R represents red, G represents green, and B represents blue.

The AFE 18 generates a timing signal for driving the CCD 16, conducts sampling of signals output from the CCD 16, conducts gain adjustment, and then converts the signals to digital captured-image signal (RAW-RGB data), and outputs the RAW-RGB data to the signal processor 20.

The lens barrel includes, for example, a lens unit 12, an aperture unit, and a mechanical shutter unit 14. A drive unit for these units is driven by the motor driver 26. The motor driver 26 is driven by a drive signal transmitted from the signal processor 20. The ROM 22 stores control programs. The SDRAM 24 stores various data temporarily.

The signal processor 20 includes, for example, a central processing unit (CPU) 40, a CCD interface (I/F) 42, an image signal processor (ISP) 44, and a memory controller 52. When an operation input is conducted through the operation unit 30, based on the operation input, the CPU 40 conducts a system control of the image capturing apparatus 10 using control programs stored in the ROM 22. FIG. 1 indicates data bus between each unit and the CPU 40 in the signal processor 20 by dashed lines. The operation unit 30 includes a shutter-release button, a power button, a menu button disposed on a casing of the image capturing apparatus 10. A shooter operates the operation unit 30 to input operation information to the CPU 40.

The CCD I/F 42 outputs a horizontal synchronization signal (HD) and a vertical synchronization signal (VD) to the AFE 18, and receives an input of RAW-RGB data, output from the AFE 18, by corresponded to the synchronization signals. In FIG. 1, the synchronization signal communicated with a sensor in the signal processor 20 is indicated by a dotted line. The memory controller 52 controls the SDRAM 24 such as writing of data to the SDRAM 24, and reading of data from the SDRAM 24. The ISP 44 will be described later.

The signal processor 20 further includes, for example, a YUV converter 46 that converts the received RAW-RGB data to YUV data, a re-sizing unit 48 that changes image size, and an output I/F 54. The output I/F 54 is an interface used for writing image data to a memory card 34, and outputting image data to the display 28. The signal processor 20 further includes, for example, a compressor 50. The compressor 50 converts image data to Joint Photographic Experts Group (JPEG) format, Moving Picture Experts Group (MPEG) format or the like.

The SDRAM 24 stores RAW-RGB data received by the CCD I/F 42, YUV data converted by the YUV converter 46, and image data of JPEG format and MPEG format compressed by the compressor 50.

The YUV data is a data format expressing color using information of luminance data (Y), and color difference such as difference (U) of luminance data and blue (B) component data, and difference (V) of luminance data and red (R) component data. When conducting this image conversion, the CPU 40 sets a white balance gain to the ISP 44.

The ISP 44 is a main part of the signal processor 20 that conducts gain processing, gamma correction, and color correction. Further, to be described later, the ISP 44 conducts measurement or detection of white balance of image (detection of auto white balance (AWB)), and measurement or detection of brightness of image (detection of auto exposure (AE)). The CPU 40 reads detected value to compute white balance correction and brightness correction, and sets correction value for the CCD 16 via a gain processing by the ISP 44 and the CCD I/F 42.

The accelerometer 32 is a physical sensor that detects a movement level of the image capturing apparatus 10 within a given frame rate (e.g., 30 fps). Based on this movement information, image stabilization is conducted. Further, the image capturing apparatus 10 can use the accelerometer 32 to detect the movement when conducting white balance correction processing.

(Image Capturing Operation of Still Image by Image Capturing Apparatus)

A description is given of an image capturing operation of still image by the image capturing apparatus 10. When a still image capturing mode is activated, the image capturing apparatus 10 conducts an image capturing operation by conducting the following monitoring operation.

When a shooter or user presses a power button, and sets an image capturing mode, the image capturing apparatus 10 is activated by a recording mode. The CPU 40 outputs a control signal to the motor driver 26 to move the lens barrel at an imaging position, and activates the CCD 16, the AFE 18, the signal processor 20, the ROM 22, the SDRAM 24, and the display 28.

Then, by directing the lens unit 12 of the lens barrel to an object, an object image is formed on a light receiving face of the CCD 16 through the lens unit 12. Analog RGB image signal, corresponding to the object image output from the CCD 16, is input to the AFE 18, and then converted to RAW-RGB data (e.g., 12 bit). The RAW-RGB data is then transmitted to the ISP 44 via the CCD I/F 42 in the signal processor 20, and the ISP 44 conducts image processing to the RAW-RGB data. Then, the YUV converter 46 converts the RAW-RGB data to YUV data (e.g., 8 bit). Then, the re-sizing unit 48 converts size of the YUV data, and the memory controller 52 stores the YUV data in the SDRAM 24.

As above described that the RAW-RGB data is transmitted to the ISP 44 via the CCD I/F 42 in the signal processor 20 and the ISP 44 conducts the image processing to the RAW-RGB data, and then the YUV converter 46 converts the RAW-RGB data to YUV data (e.g., 8 bit) in the image capturing apparatus 10, in which image data is not stored at the ISP 44 temporarily, and the signal processing is completed based on the synchronization signal from the CCD 16, with which a throughput of the signal processor 20 can be enhanced.

YUV data read from the SDRAM 24 via the memory controller 52 is output to the display 28 via the output I/F 54, with which an image is displayed on the display 28. With this configuration, the shooter can check a composition of a still image when shooting.

The signal processor 20 computes an automatic exposure (AE) evaluation value and an automatic white balance (AWB) evaluation value based on RAW-RGB data input via the CCD I/F 42. The AE evaluation value and AWB evaluation value can be computed as an integrated value for each of R, G, and B of RAW-RGB data. For example, a captured image corresponding to the light receiving face of entire pixels of the CCD 16 is divided into a given number of blocks evenly (e.g., 256 blocks by dividing an image in 16 blocks in the horizontal direction and 16 blocks in the vertical direction), and RGB cumulative value for each block is computed as an evaluation value.

The CPU 40 reads out the computed RGB cumulative value to compute a white balance gain so as to set a suitable white balance. Further, in the AWB processing, a control value for AWB matched to a color of light emitted from a light source that irradiates the light onto an object is determined based on a RGB profile. By conducting this AWB processing, a white balance when the YUV converter 46 converts data to YUV data is adjusted. Further, in the AE processing, the CPU 40 computes luminance for each one of blocks of a captured image, and determines a suitable exposure level based on a luminance profile. Based on the determined exposure level, the CPU 40 sets exposure conditions (e.g., exposure time of the CCD 16, aperture value of the aperture unit, analog gain or the like). Further, the AE processing and AWB processing are continuously conducted when the monitoring is conducted. As such, the CPU 40 can be used as a control unit in the first example embodiment.

When a shutter-release button is pressed from a half press to a full press during the monitoring, the CPU 40 transmits a drive command to the motor driver 26 to move a focus lens of the lens unit 12, with which an AF operation is conducted, and a still image is recorded. The AF operation employs, for example, a contrast evaluation method known as hill-climbing AF.

Then, the above described AE processing is conducted. When the exposure is completed, the CPU 40 transmits a drive command to the motor driver 26 to close the mechanical shutter unit 14, and the CCD 16 outputs analog RGB image signal for a still image. Then, similar to the monitoring operation, the analog RGB image signal is converted to RAW-RGB data by the AFE 18, and then input to the CCD I/F 42 of the signal processor 20. Then, the ISP 44 conducts an image processing to the RAW-RGB data, the YUV converter 46 converts the RAW-RGB data to YUV data, the re-sizing unit 48 converts a size of YUV data to a size of the number of pixels used for recording, and the YUV data is stored in the SDRAM 24 via the memory controller 52. Then, the YUV data is read from the SDRAM 24, and compressed to image data of JPEG format by the compressor 50. The compressed image data is stored in the memory card 34 via the output I/F 54.

In the above description, a flow of the image capturing operation of still image is described. Further, an image capturing operation of movie image can be conducted with the similar flow except that a compression format employs a movie format such as MPEG format instead of a still image format such as JPEG format.

A description is given of white balance for the image capturing operation of still image, and this white balance technology can be also applied to a movie image.

(White Balance Correction Processing)

As described above, when an image capturing operation is conducted by the image capturing apparatus 10, white balance correction is conducted by an image processing.

If it is assumed that an image frame (hereinafter, "frame") to be detected and an image frame to be corrected is the same frame, a greater memory capacity for storing frame data is required, which results into longer time for processing, and further, frame delay becomes greater, and thereby constrains of continuous shooting of the image capturing operation of still image becomes greater.

Further, as to the image capturing operation of movie image, if it is assumed that an image frame (hereinafter, "frame") to be detected and an image frame to be corrected is the same frame, a frame rate cannot be set to a faster rate, If a given frame rate is to be maintained, the resolution should be set smaller, or if a given frame rate and a given resolution are to be maintained, a hardware having higher performance is required, with which constrains of the image capturing operation of movie image becomes greater. Further, since the frame data is stored in a memory, cost increases due to the memory, and complexity of the entire system increases.

By contrast, when different frames are used for a frame to be detected and a frame to be corrected without storing frame data, and white balance correction coefficient is computed at a blank time between the frames, processing time can be set shorter, and frame delay can be set shorter. However, in this case, if a movement occurs between the frames, a correction coefficient is computed based on the frame detected in the past, and this correction coefficient is applied to a current frame, which may result into deviation of color tone at a boundary between areas having different color temperature such as a shade area and a sunny area.

Therefore, as to the image capturing apparatus 10 of the first example embodiment, a movement between frames is detected (e.g., how an object moves or how a camera moves), and based on the detected movement, a boundary area (i.e., blending area) used for mixing or blending white balance correction coefficients corresponding to the areas having different color temperature is determined. With this configuration, even if a frame to be detected and a frame to be corrected are different frames, correction coefficients can be blended at the boundary area based on the movement detected between the frames. Therefore, unnaturalness of white balance at the boundary area can be reduced, in particular prevented while reducing constrains on frames used for detection and correction.

Figure 2:
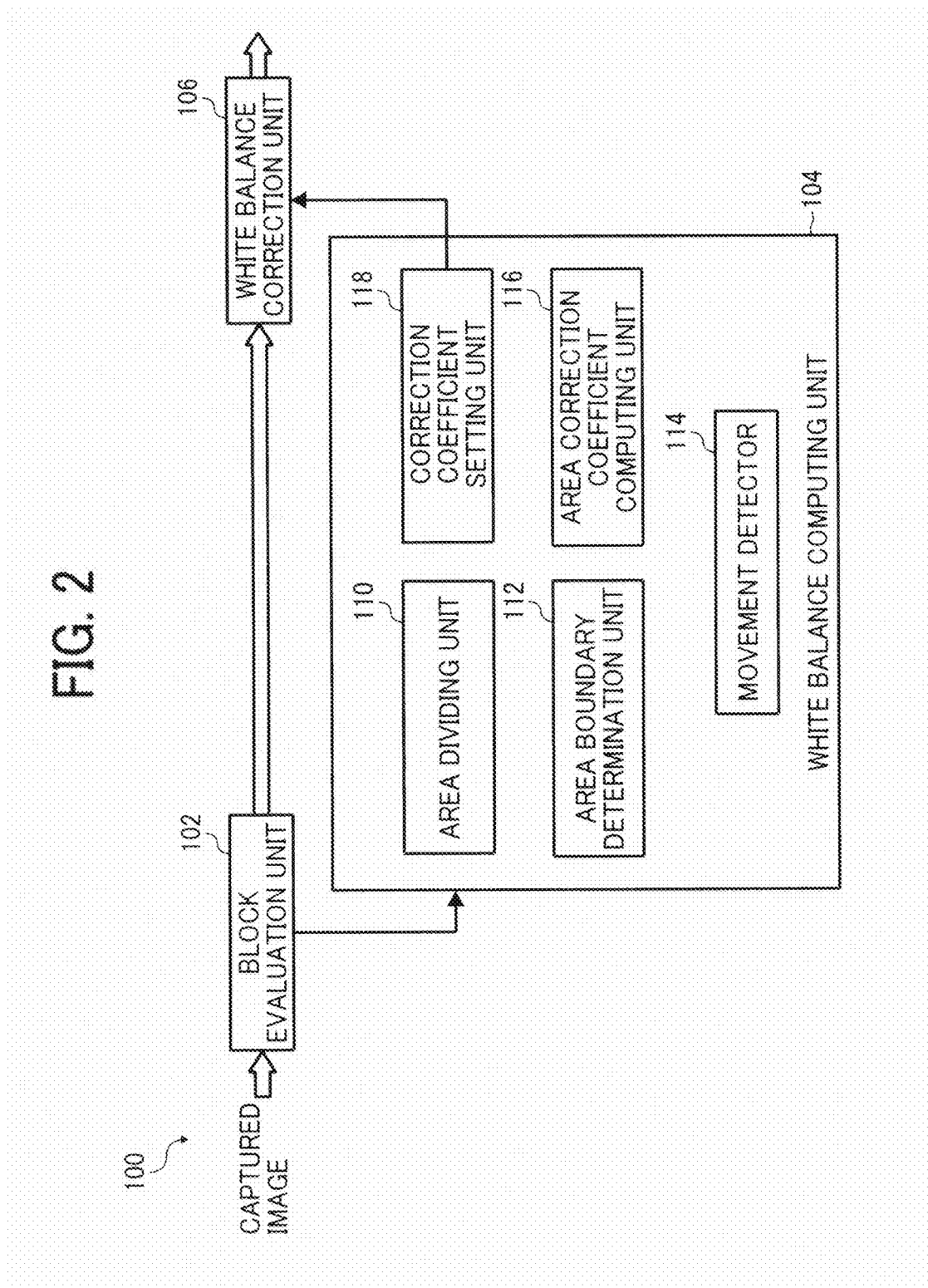
FIG. 2 is a functional block diagram of white balance correction processing according to a first example embodiment.

A description is given of a white balance correction processing conductable by the image capturing apparatus 10 according to the first example embodiment with reference to FIG. 2 to FIG. 10. FIG. 2 is a functional block diagram of white balance correction processing according to the first example embodiment. As illustrated in FIG. 2, a functional block 100 includes, for example, a block evaluation unit 102, a white balance computing unit 104, and a white balance correction unit 106.

The block evaluation unit 102 divides a captured image, corresponding to a light receiving face of entire pixels, into a given number of blocks, computes RGB cumulative value for each one of blocks based on RAW-RGB data received by the CCD I/F 42 from the CCD 16 with a synchronization signal. The block evaluation unit 102 is configured as a part of the CCD I/F 42 of the signal processor 20 illustrated in FIG. 1. The block evaluation unit 102 can be used as an evaluation unit in the first example embodiment.

Based on the RGB cumulative value for each block evaluated by the block unit 102, the white balance computing unit 104 computes a white balance correction coefficient for each pixel, and sets the white balance correction coefficient to the white balance correction unit 106. The white balance computing unit 104 can be configured, for example, with a combination of the CPU 40 and the ISP 44 of the signal processor 20 illustrated in FIG. 1. For example, the CPU 40 computes a correction coefficient for each mesh defined for the entire area of an image, in which each mesh may or may not be matched to each block, and sets the correction coefficient to the ISP 44. The ISP 44 interpolates the correction coefficient for each mesh to compute a correction coefficient for each pixel.

The white balance correction unit 106 multiplies a white balance correction coefficient for each pixel to each of R and B data of RAW-RGB data received by the CCD I/F 42 from the CCD 16 to conduct a correction. The white balance correction unit 106 can be configured, for example, with the ISP 44 of the signal processor 20 illustrated in FIG. 1. The white balance correction unit 106 can be used as an image correction unit in the first example embodiment.

The block evaluation unit 102 computes an AWB evaluation value based on an image of a first frame (N) captured at a first time point, input from the CCD I/F 42. Then, based on the computed AWB evaluation value, the white balance computing unit 104 computes a correction coefficient for each pixel, and conducts a correction to a second frame (N+1) captured at a second time point, which is after the first time point. In the first example embodiment, the signal processing to RAW-RGB data is completed using a synchronization signal without storing image data in a memory temporarily, The white balance computing unit 104 includes, for example, an area dividing unit 110, an area boundary determination unit 112, a movement detector 114, an area correction coefficient computing unit 116, and a correction coefficient setting unit 118.

Based on the AWB evaluation value for each block, the area dividing unit 110 recognizes a sunny area and a shade area in an input image, and divides the input image into the sunny area and the shade area. The area correction coefficient computing unit 116 computes a white balance correction coefficient for each of the sunny area and the shade area, which are the divided areas.

The sunny area and the shade area are areas that have different color temperature (i.e., different lighting conditions). When the sunny area and the shade area (i.e., a plurality of areas) exist, and the entire area of image is corrected using the correction coefficient for either one of the sunny area or the shade area, it is difficult to reproduce natural color for the entire area of image. In the first example embodiment, the sunny area and the shade area are recognized and divided based on a recognition algorism defined in advance, and then a white balance correction coefficient is set each of the sunny area and the shade area. In the first example embodiment, the area dividing unit 110 can be used as an area dividing unit, and the area correction coefficient computing unit 116 can be used as a computing unit.

The movement detector 114 detects a movement between frames supplied along the time line. For example, in one configuration, the movement detector 114 can detect the movement between frames based on an image processing. A detection method of movement based on the image processing will be described later. Further, in another configuration, the movement detector 114 can detect a movement between frames based on an output of a physical sensor such as the accelerometer 32. Further, the movement information detectable by the movement detector 114 includes an amount of movement, a direction of movement, or both of the amount of movement and direction of movement.

The area boundary determination unit 112 determines a boundary for blending a correction coefficient of a sunny area and a correction coefficient of a shade area based on a movement detected by the movement detector 114. The boundary may have some width in one or more directions. If an amount of movement is acquired, the area boundary determination unit 112 can determine an area size of boundary depending on the amount of movement. Further, if a direction of movement is also acquired, the area boundary determination unit 112 can determine an area size of the boundary depending on the amount of movement, and can shift the boundary toward either the sunny area or the shade area depending on the direction of movement. In the one or more example embodiments, the area boundary determination unit 112 can be used as a boundary determination unit.

The correction coefficient setting unit 118 sets a white balance correction coefficient data for each pixel based on blocks composing the sunny area, blocks composing the shade area, a correction coefficient for the sunny area, a correction coefficient for the shade area, and blocks composing the boundary.

As described above, a captured image is divided into meshes, and a correction coefficient of an area where meshes belong is set for each mesh. A correction coefficient for meshes belonging to the boundary can be set by computing a weighted average of a correction coefficient for the sunny area and a correction coefficient for the shade area based on a positional relationship. Then, after setting correction coefficients for all meshes, a correction coefficient for each pixel is computed by conducting a linear interpolation based on the correction coefficient for each mesh. In the first example embodiment, the correction coefficient setting unit 118 can be used as a setting unit.

Figure 3:
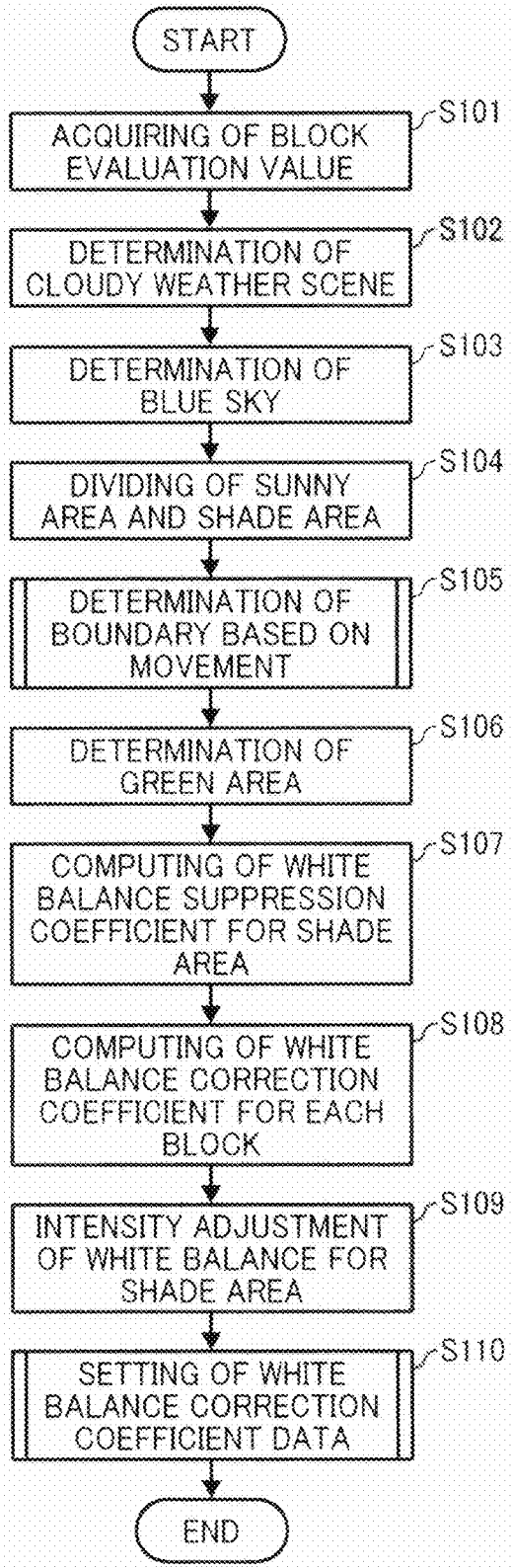
FIG. 3 is a flowchart showing the steps of white balance correction according to a first example embodiment.

A description is given of the white balance correction processing according to the first example embodiment in detail with reference to FIGS. 3, 4, 5, 6, 7, and 8. FIG. 3 is a flowchart showing the steps of white balance correction according to the first example embodiment.

At step S101, the block evaluation unit 102 divides RAW-RGB data into a given number of blocks evenly, and RGB value is cumulated for each of the divided blocks to acquire an AWB evaluation value. The dividing number of blocks is not limited to any specific number. It may be preferable to divide all blocks evenly with the same area and same shape, but blocks can be divided unevenly. In this example case, information of R, G, or B component of an object is recorded in each of pixels existing in each of blocks, and RGB cumulative value, which is the AWB evaluation value, can be computed by computing a weighted average of R, G, and B components of the all pixels in each of the blocks.

At step S102, the white balance computing unit 104 conducts a determination of cloudy weather scene based on the RGB cumulative value of the entire area of a captured image obtained by adding the RGB cumulative value of all of the acquired blocks, shutter speed (Tv), aperture value (Av), and sensitivity (Sv). The determination of cloudy weather scene is a process of determining the entire area of captured image.

At step S103, the white balance computing unit 104 can conduct a blue sky area determination for each of blocks. In this blue sky area determination, blocks having greater B component is determined as a blue sky area.

At step S104, the area dividing unit 110 classifies a sunny area and a shade area for each of blocks based on RGB cumulative value and luminance value (Y) computed from the RGB cumulative value. As to the example embodiment, the entire area of a captured image is divided into two areas by classifying the sunny area and the shade area, but the dividing area of image is not limited to two areas. In general, a captured image can be divided into "n" blocks and then divided into "m" areas, wherein "m" and "n" are numbers satisfying a relationship of "n>m≥2," in which one area can be prepared by consolidating a plurality of blocks.

A description is given of dividing of an image into a sunny area and a shade area with reference to one example. An image can be classified into the sunny area and shade area based on a dividing condition using luminance value (Y), and B/R, which is a ratio of red component (R) and blue component (B) for each block. The dividing condition includes, for example, a condition that luminance value (Y) is less than a given threshold (e.g., luminance value (Y) is less than 40%), and B/R is greater than a given threshold (e.g., B cumulative value is greater than two times of R cumulative value). If blocks satisfy this dividing condition, the blocks are determined as a shade area, and other blocks are determined as a sunny area. In this example case, to prevent an application of the correction coefficient of the shade area to a blue sky area, blocks determined as the blue sky area and also the shade area can be changed to the sunny area. Further, to prepare an area with a given size or more, small areas dispersed within one large area can be integrated into the one large area.

Based on the movement measured or detected by the movement detector 114, at step S105, the area boundary determination unit 112 determines boundary blocks of the sunny area and the shade area at a boundary where the sunny area and the shade area are adjacent.

Figure 6A:
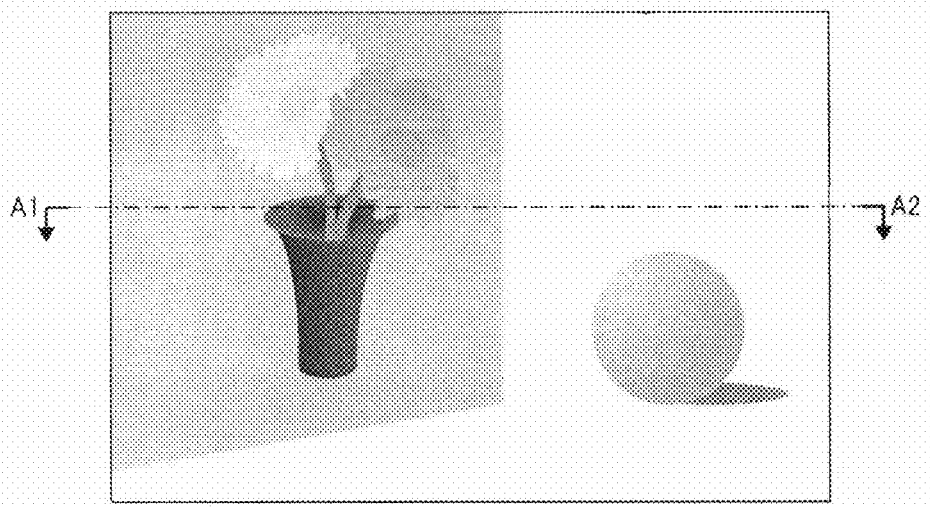
FIG. 6A is an example of a captured image.
Figure 6B:
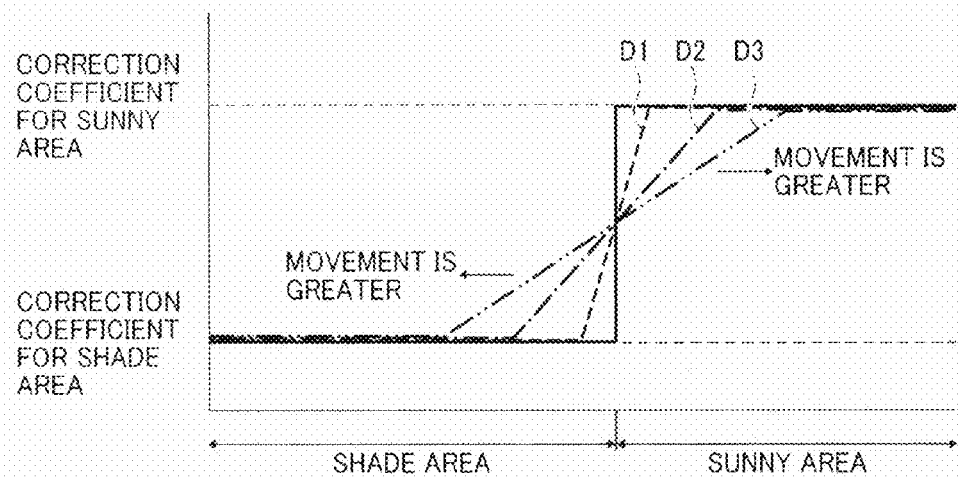
FIG. 6B is a graph used for setting a white balance correction coefficient in a direction between A1 and A2 indicated by arrows for the captured image of FIG. 6A.

FIG. 6A is an example of a captured image. FIG. 6B is a graph used for setting a white balance correction coefficient at one dimensional direction between A1 and A2 indicated by arrows for the captured image of FIG. 6A. The captured image of FIG. 6A has a shade area and a sunny area. In this example case, it is preferable to set a correction coefficient for the shade area to the shade area, and a correction coefficient for the sunny area to the sunny area.

If the correction coefficients suitable for each of areas are applied as they are, the white balance correction coefficient is applied with a rectangular function as indicated by a solid line in FIG. 6B. If the white balance correction coefficient is applied with the solid line pattern, color temperature changes greatly at a boundary of the shade area and the sunny area as indicated in FIG. 6B, which results into an image having unnaturalness. Therefore, as indicated by dotted lines (i.e., lines having gradient) in FIG. 6B, a weighted average of correction coefficients is computed at the boundary so that difference of color tone at the boundary does not become evident.

When a frame to be detected and a frame to be corrected are different frames and an image moves for a given level or more between the frames, the boundary deviates between the detected image and the to-be-corrected image, and the boundary becomes too evident when blending is conducted with a fixed width blending indicated by the dot line D1 in FIG. 6B.

The determination process of boundary blocks for the sunny area and the shade area conducted at the above described step S105 is a process of determining a boundary area for blending the correction coefficients depending on the movement level. In one preferable configuration, the greater the movement, the greater the blending area (i.e., boundary) is set depending on a measurement result of the movement as indicated by the long dashed short dashed line D2 and the long dashed double-short dashed line D3 in FIG. 6B.

FIG. 4 is a flowchart showing the steps of a determination process of a boundary of a sunny area and a shade area based on a movement of an image conductable by the area boundary determination unit 112. The process of FIG. 4 is called at step S105 of FIG. 3 and started. At step S201, the area boundary determination unit 112 conducts measurement of a movement using the movement detector 114, in which the movement is measured by the image processing or the accelerometer 32, and then a measurement result of the movement is transmitted to the area boundary determination unit 112. At steps S202 and S203, the sequence proceeds depending on the measured movement.

At steps S202 and S203, when it is determined that the measured movement is within a given range from a lower limit to an upper limit (S202: YES, S203: YES), the sequence proceeds to step S204. At step S204, the area boundary determination unit 112 sets an internal parameter to "mode 1," and the sequence proceeds to step S207.

Further, at steps S202 and S203, when it is determined that the measured movement is greater than the upper limit (S202: YES, S203: No), the sequence proceeds to step S205. At step S205, the area boundary determination unit 112 sets the internal parameter to "mode 2," and the sequence proceeds to step S207. Further, at step S202, when it is determined that the measured movement is the lower limit or less (S202: No), the sequence proceeds to step S206. At step S206, the area boundary determination unit 112 sets the internal parameter to "mode 0," and the sequence proceeds to step S207.

At step S207, a boundary determination method is determined depending on the internal parameter. When it is determined that the internal parameter is "mode 0" at step S207, the sequence proceeds to step S208. This case corresponds to a case that no movement is measured. Therefore, at step S208, the area boundary determination unit 112 determines a default value such as one block area as the boundary, and the determination process of the boundary is ended, and returns the sequence to the process of FIG. 3.

Figure 7A:
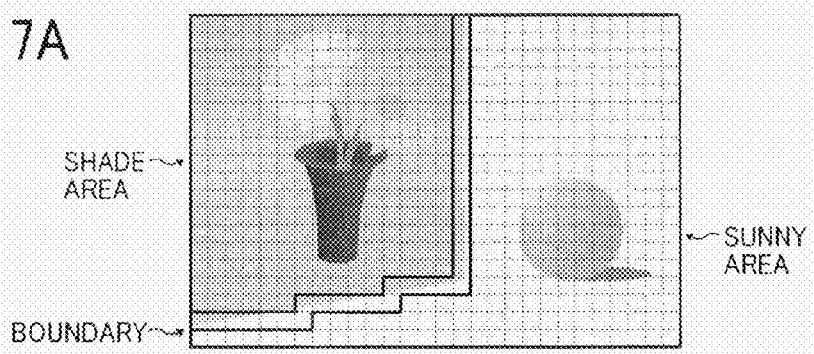
FIG. 7A is an example image setting one block as a boundary when an internal parameter is mode 0.

FIG. 7A is an example image of setting one block as the boundary when the internal parameter is "mode 0." In an example cases of FIG. 7, a sunny area, a shade area, and a boundary are segmented by bold lines. In case of "mode 0," as illustrated in FIG. 7A, one block at the boundary of the shade area and the sunny area in a captured image is set as the boundary. In this case, one block belonging to the sunny area and facing the shade area can be determined as the boundary, or one block belonging to the shade area and facing the sunny area can be determined as the boundary, wherein the one block belonging to the shade area and facing the sunny area may be preferable.

Further, when it is determined that the internal parameter is "mode 1" at step S207, the sequence proceeds to step S209. At step S209, the area boundary determination unit 112 determines the boundary based on a size and direction matched to the measured movement, and the determination process of the boundary is ended, and returns the sequence to the process of FIG. 3. Therefore, a width of the boundary of the sunny area and the shade area becomes greater than one block.

Figure 7B:
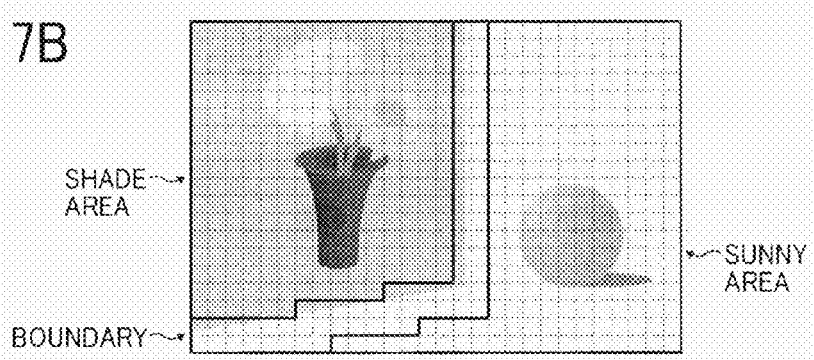
FIGS. 7B to 7D are example images setting a boundary depending on an internal parameter and an amount of movement.
Figure 7C:
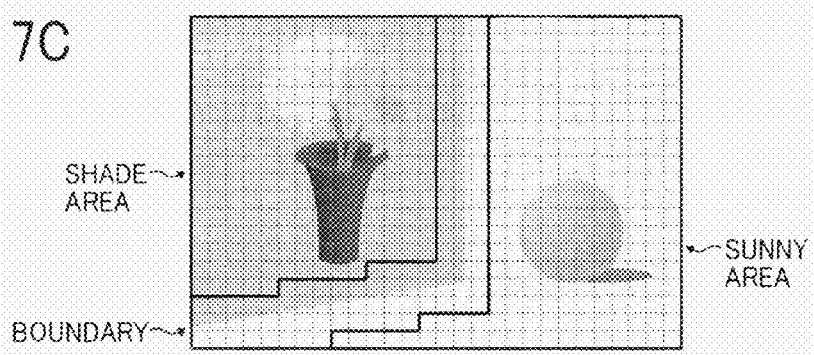
Figure 7D:
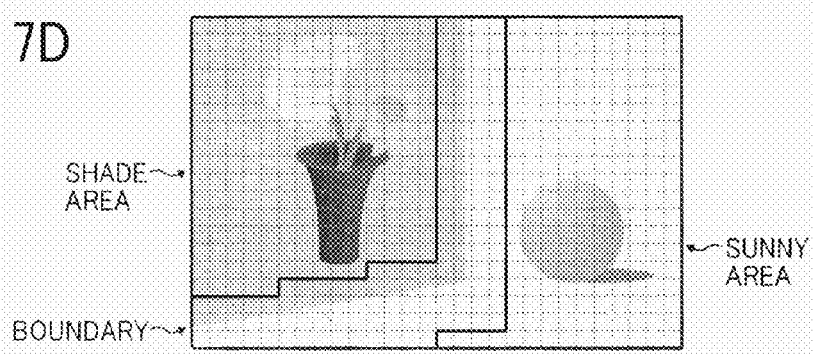

FIGS. 7B to 7D are example images of setting the boundary depending on a measurement result of movement when the internal parameter is "mode 1." FIGS. 7B to 7D illustrate determination methods of the boundary when an amount of movement is set three levels such as "small, middle, and large." When "mode 1" is set, as indicated in FIGS. 7B to 7D, a width of boundary between the shade area and the sunny area in a captured image can be set greater one by one block as the amount of movement becomes greater, with which the boundary is determined.

Figure 8A:
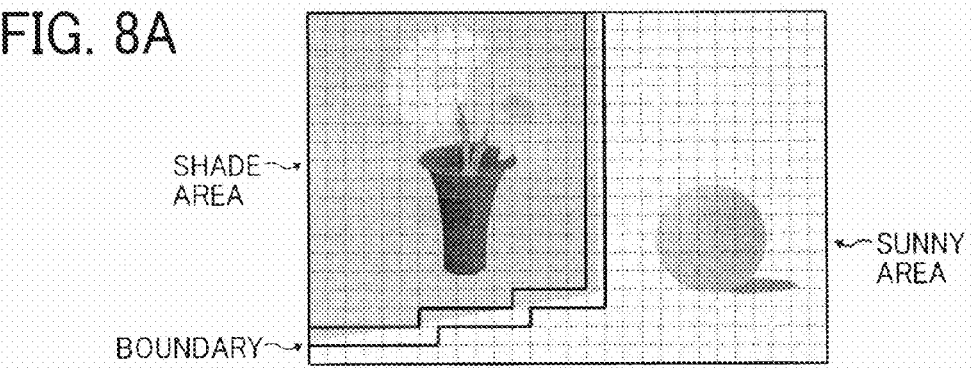
FIGS. 8A to 8C are example images setting a boundary depending on an amount of movement and a direction of movement.
Figure 8B:
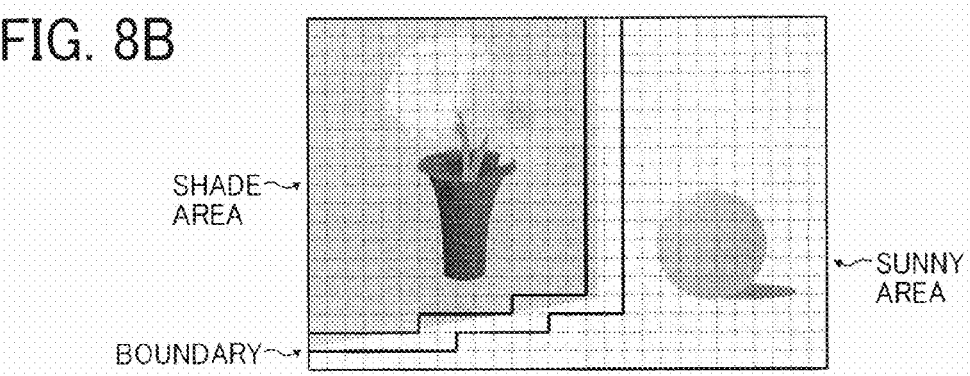
Figure 8C:
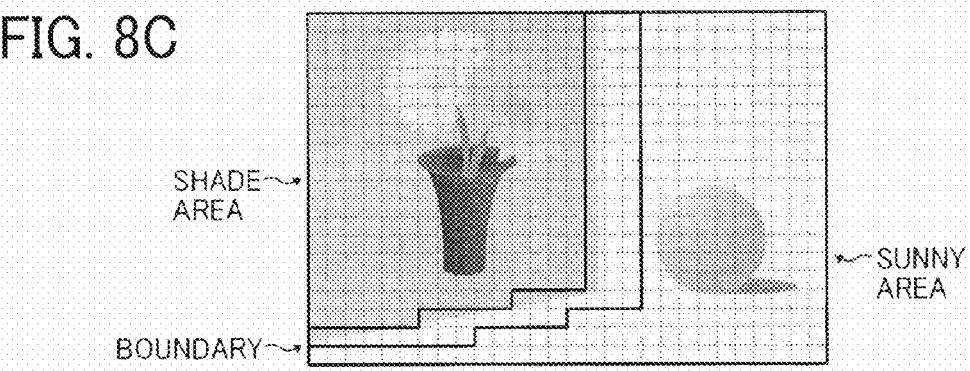

In example cases of FIGS. 7B to 7D, the both ends of the boundary is widened gradually and step wisely. However, the widening of the boundary is not limited hereto. For example, when a direction of movement can be also acquired, as illustrated in FIGS. 8A to 8C, the boundary can be widened in the same direction of the movement, with which an image having natural appearance can be reproduced in view of the direction of movement of the image.

Further, when it is determined that the internal parameter is "mode 2" at step S207, the sequence proceeds to step S210. At step S210, a uniform white balance is applied to the entire area of the captured image without consideration to the areas. In this example case, the boundary is not determined, and the determination process of the boundary is ended, and returns the sequence to the process of FIG. 3. The "mode 2" is a mode when the measured movement is determined greater than the upper limit. When the movement is too great, difference of areas having different color temperature becomes great, with which the boundary becomes too evident, which is not preferable. As an exceptional processing of the example embodiment, color temperature is not changed for the shade area and the sunny area, but the uniform white balance correction coefficient is set to the entire area of the captured image.

Referring back to FIG. 3, at step S106, the white balance computing unit 104 determines whether each one of blocks is a green area based on G/R and G/B. In this green area determination processing, when one area has G component greater than R component and B component, the one area is determined as a green area.

At step S107, the white balance computing unit 104 computes a white balance suppression coefficient for the shade area that suppresses white balance when the luminance value (Y) becomes greater. For example, under an environment that rain falls and then the weather becomes sunny, a wet ground face, which appears as somewhat black face by the irradiated sunlight, is captured as an object. Although the wet ground face has relatively higher luminance, the wet ground may be determined as a shade area. When a sunny area having a little dark tone is falsely determined as a shade area, a white balance for the shade area is applied to the sunny area, with which coloring occurs to the image. Such coloring phenomenon can be suppressed by using the white balance suppression coefficient for the shade area.

At step S108, the area correction coefficient computing unit 116 computes a white balance correction coefficient for each of blocks that can set color of a white object as white. In this case, at first, a white extraction is conducted for each of the sunny area and the shade area. In this white extraction, G/R and G/B for each of blocks are obtained for each of areas from RGB cumulative values, and blocks included in a white extraction area indicating a black body radiation curve on the color coordinates having G/R axis and G/B axis, is stored as white extraction blocks. The white extraction area can be varied for the sunny area and the shade area.

When the white extraction blocks are extracted for each of the sunny area and the shade area, weighting of areas is conducted. For example, an area having greater average luminance is weighted greatly, and then an average G/R and an average G/B of white extraction block are computed. Then, the computed average G/R and average G/B are corrected so that the average G/R and the average G/B can be within the black body radiation curve, and then used as white balance correction coefficients. Further, in this case, when it is determined that an image is a cloudy weather scene at step S102, to conduct the white balance processing not causing unnatural image, a white balance correction coefficient is set to a value that can reduce difference between a correction coefficient for the sunny area and a correction coefficient for the shade area.

At step S109, the white balance computing unit 104 computes a weighted average of a correction coefficient for the sunny area and a correction coefficient for the shade area depending on brightness (Lv) of an object to conduct an intensity adjustment of the correction coefficient for the shade area. By adjusting the intensity of white balance correction coefficient for the shade area depending on brightness (Lv) of the object, for example, in a room relatively darker compared to the outdoor, or a scene where a sunny area and a shade area are not so evident, even if the white balance is applied to the sunny area and the shade area, unnatural image reproduction may not occur. Further, if brightness (Lv) of the object is greater, a limit processing can be conducted so that a difference between a correction coefficient for the shade area and a correction coefficient for the sunny area can be set within a given range.

At step S110, the correction coefficient setting unit 118 computes and sets white balance correction coefficient data for each pixel by using the white balance correction coefficient for the sunny area and white balance correction coefficient data for the shade area determined in the above described processes.

FIG. 5 is a flowchart showing the steps of computing and setting a white balance correction coefficient for each pixel conductable by the correction coefficient setting unit 118 according to the first example embodiment. The process of FIG. 5 is called at step S110 of FIG. 3 and started.

At step S301, the correction coefficient setting unit 118 selects a computing method of correction coefficient based on an internal parameter. When it is determined that the internal parameter is "mode 0" or "mode 1" at step S301, the sequence proceeds to step S302, which corresponds to cases that the movement is within a given target range, defined by the lower limit and upper limit in FIG. 4. At step S302, the correction coefficient setting unit 118 sets a white balance correction coefficient for each mesh belonging to each of the boundary determined at step S105 based on the sunny area, the shade area, and the movement.

As to meshes for the sunny area, the white balance correction coefficient for the sunny area can be used as it is. As to meshes for the shade area, a white balance correction coefficient for the shade area after conducting the intensity adjustment is set. As to meshes for the boundary, white balance correction coefficients set to meshes of the shade area and the sunny area, adjacent with each other, are interpolated depending on position coordinates to set the white balance correction coefficient for the boundary.

Further, to prevent unnaturalness of green color appearance to human eyes, sensitive to green, as to meshes corresponding to the shade area and the green area, a weighted average is computed by setting a weight of 70% for the sunny area and a weight of 30% for the shade area to set a white balance correction coefficient.

At step S303, the correction coefficient setting unit 118 sets a white balance correction coefficient for each pixel by conducting an interpolation based on the white balance correction coefficient for each mesh. In the first example embodiment, a gain for each of R, G, and B can be set for each lattice point of meshes with the same number of meshes of blocks for the AWB evaluation value, and the gain is interpolated between meshes by the bi-linear interpolation.

Specifically, the center of each mesh is set as a target pixel, and white balance correction coefficients $Gain_R$ and $Gain_B$ computed for the sunny area and the shade area respectively are set to the target pixel of mesh. The correction coefficient $Gain_R$ and $Gain_B$ for a non-target pixel can be obtained from a correction coefficient set to a target pixel of the concerned mesh, a correction coefficient set to a target pixel of a surrounding mesh, and an interpolation based on distance from the target pixel.

The boundary is an area for blending correction coefficients. Therefore, the greater the area of the boundary, the smaller the gradient in the boundary as shown in FIG. 6B, in which color temperature can be changed gradually with a greater area.

When it is determined that the internal parameter is "mode 2" at step S301, the sequence proceeds to step S304, which corresponds to a case that the movement is too great. At step S304, the above described correction coefficients for the sunny area and the shade area are cancelled, and a uniform white balance correction coefficient is applied to the entire area of the captured image including the sunny area and the shade area.

The uniform white balance correction coefficient applied to the entire area of the captured image can be determined using following methods. As a first method, it is determined which of the shade area and the sunny area is greater than other area, and a white balance correction coefficient of the greater area is used. As a second method, an area ratio of the shade area and the sunny area is computed, and a white balance correction coefficient for the sunny area and a white balance correction coefficient for the shade area are averaged in line with the area ratio. As a third method, when AWB detection value is used, an integrated value for each block is not used, but an integrated value for the entire area of the captured image is used to determine a white balance correction coefficient.

Upon completing steps S303 or S304, the process ends, and returns to the process of FIG. 3. Referring back to FIG. 3, the correction coefficient data for each pixel is set at step S110, and then the process ends. Thereafter, the white balance correction unit 106 multiplies the computed white balance correction coefficient $Gain_R$ and $Gain_B$ to each of R and B data of RAW-RGB data for each pixel to conduct a white balance correction.

(Detection Method of Movement Based on Image Processing)

A description is given of a detection method of movement based on the above described image processing with reference to FIG. 9 used for one configuration. FIG. 9 are schematic views illustrating a process of detecting movement based on an image processing. As described above, image data (i.e., RAW-RGB data) from the CCD 16 is input to the CCD I/F 42, and then transferred to the ISP 44. Based on the transferred image data, the ISP 44 measures what movement occurs between the current frame and the previous last frame.

A description is given of a measurement method of movement with reference to FIG. 9. As illustrated in FIG. 9, a captured image is divided into a plurality of blocks. RGB integrated value is computed for each block for the very last frame (N−1) and a current frame (N). A difference of RGB integrated value for each block between the very last frame (N−1) and the current frame (N) is computed as a difference of "F(N−1)−F(N)." The total of the difference for all blocks can be measured or detected as the amount of movement. In this process, to obtain the difference, the RGB cumulative value for each block is stored in a memory for a plurality of frames.

Further, in another configuration, an optical flow can be computed to compute a difference between frames and amount of the movement with enhanced precision, in which a total of flow vectors can be used to obtain the amount of movement and the direction of movement.

When the optical flow is employed, depending on hardware capability, based on a difference of "F(N)−F(N−1)," which is a difference between an integrated value of the frame data at the time (N−1) and an integrated value of a frame data at the time (N), a correction of a frame data at the time (N+1) may be conducted. In this case, the between-frame prediction technologies, set by the movie compression technologies of ITU-T (International Telecommunication Union-Telecommunication standardization sector) H. 264 can be used to enhance precision of measurement of the amount of movement.

(Detection Process of Movement by Accelerometer)

The accelerometer 32 used for the image stabilization can detect the direction of movement and the movement length of a camera. Therefore, in one configuration, based on an output from the accelerometer 32, an amount of the movement and direction of movement at a given time can be measured. By using the accelerometer 32, without conducting the optical flow computation requiring heavy computing load, the amount of movement and the direction of movement can be measured with high precision, and computing cost can be reduced.

(Effect of First Example Embodiment)

As to the above described first example embodiment, depending on the movement between detected frames, a boundary (blending area) used for blending white balance correction coefficients of different areas having different color temperature is determined. Therefore, even if a frame to be detected and a frame to be corrected are different frames, the boundary or blending area can be increased or decreased depending on the movement of image, with which correction can be conducted so that the boundary between the areas can be reproduced as a natural image. Therefore, unnaturalness of white balance at the boundary area can be prevented while reducing time length constrain on the correction coefficient computing.

Figure 10A:
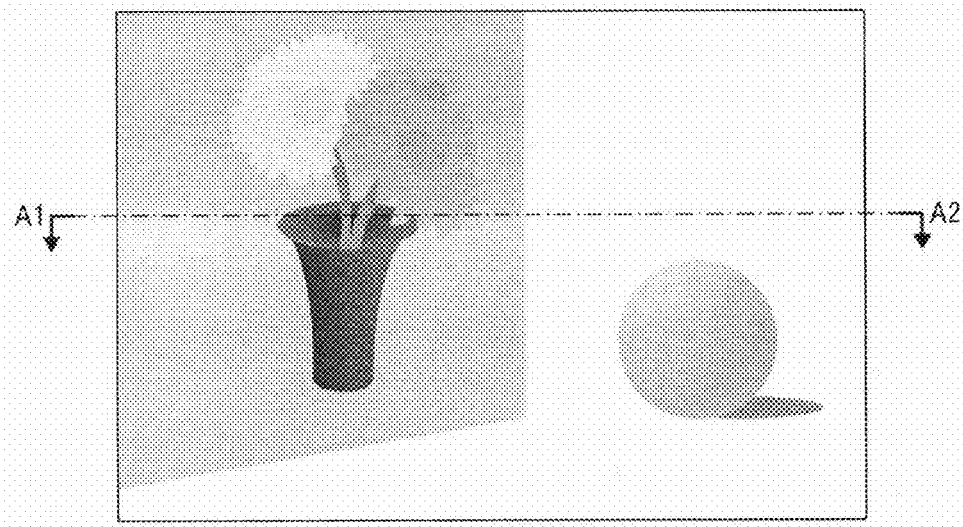
FIG. 10A is an example of a captured image.
Figure 10B:
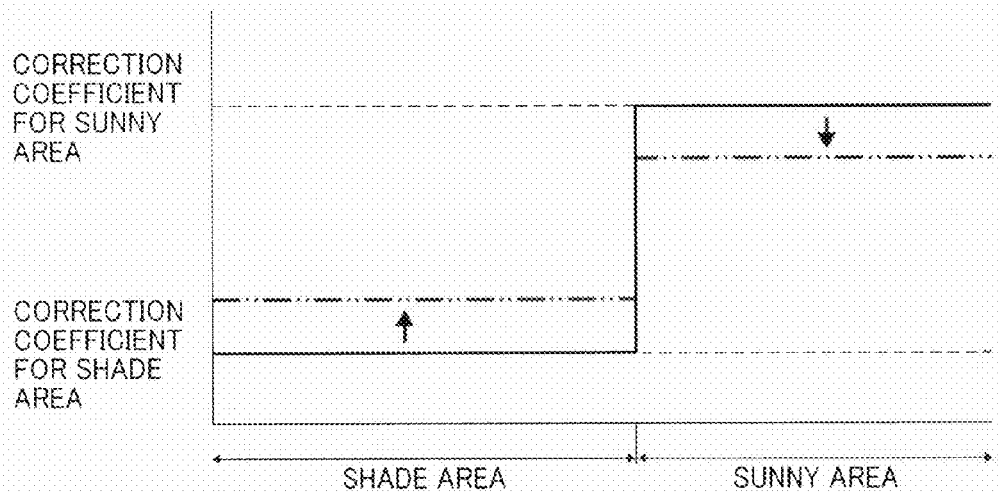
FIG. 10B is a graph for comparing white balance correction coefficients in a direction between A1 and A2 indicated by arrows for the captured image of FIG. 10A.

Other method can be applied as illustrated in FIG. 10, in which a width of the blending area is not changed, but difference of color temperature (correction coefficient) between the areas is narrowed. In this method, color shift/out of color registration at the boundary can be reduced. However, color temperature of one area other than the boundary is affected by color temperature of other area, and thereby original color temperature may not be reproduced. The white balance correction according to the first example embodiment can cope with this issue.

(Brightness Correction for Synthesis Image)

In the above described first example embodiment, the lens unit 12 employs one lens system to capture an image, and a white balance correction is conducted to the captured image to conduct an image correction coefficient computing process according to the first example embodiment. The lens system can be referred to as an optical system.

Figure 11:
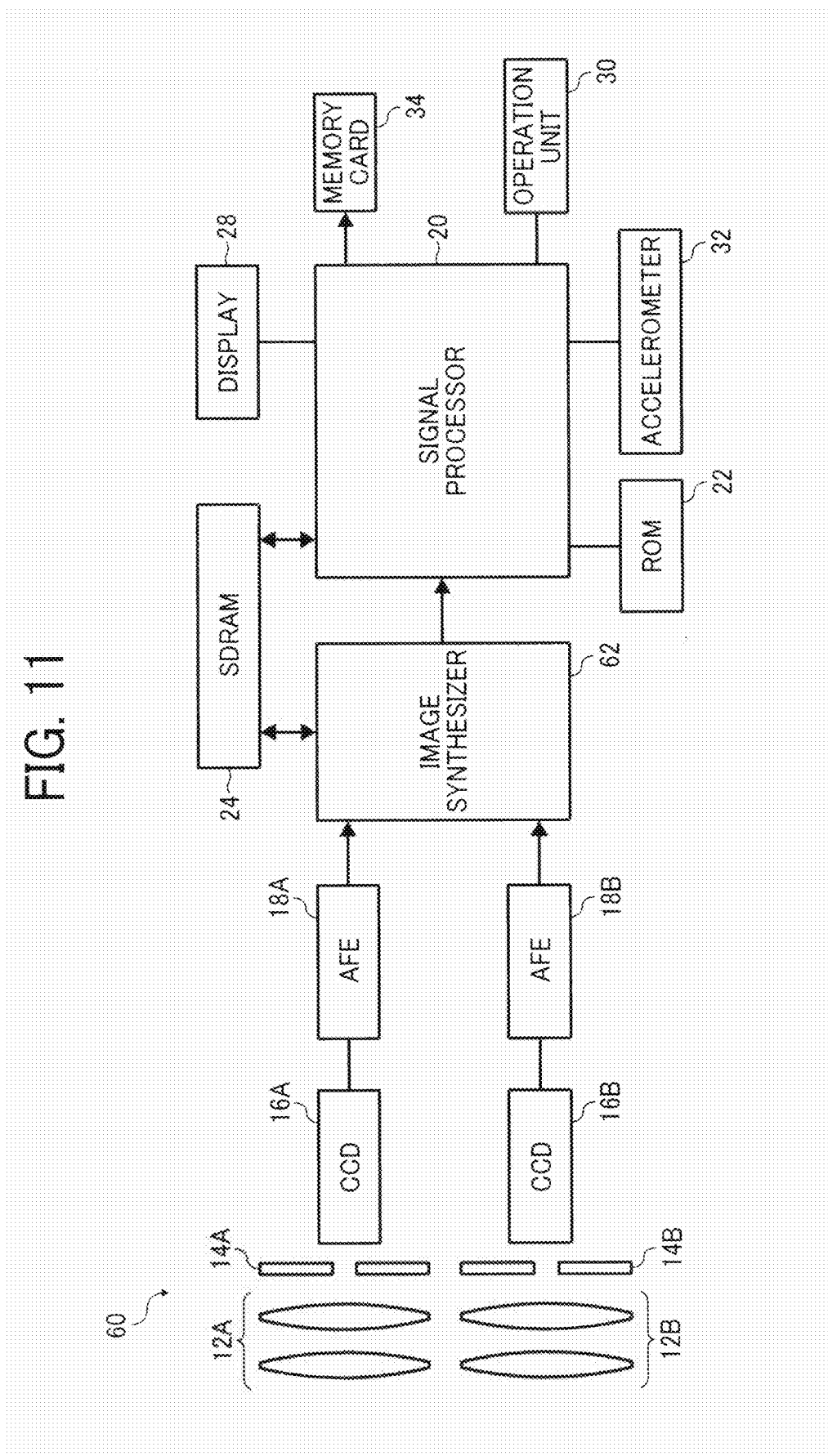
FIG. 11 is a block diagram of a system configuration of an image capturing apparatus according to a second example embodiment.

A description is given of an image correction coefficient computing process according to a second example embodiment with reference to FIG. 11 to FIG. 13, in which the lens unit 12 employs a plurality of lens systems to capture an image, and brightness correction is conducted for a synthesis image generated by synthesizing a plurality of captured images captured by the plurality of lens systems. As to the synthesis image generated by synthesizing a plurality of captured images captured by the plurality of lens systems, brightness fluctuation or difference may occur at a boundary of the synthesis image. A description is given of brightness correction processing according to the second example embodiment to reduce brightness fluctuation or difference at the boundary.

FIG. 11 is a system configuration of an image capturing apparatus 60 according to the second example embodiment. The image capturing apparatus 60 is, for example, a digital camera. The image capturing apparatus 60 of the second example embodiment employs almost common parts used for the image capturing apparatus 10 of the first example embodiment. Therefore, different points of the second example embodiment are described mainly. Further, the units or parts that conduct the same or similar functions of the first example embodiment are assigned with the same or similar references.

As illustrated in FIG. 11, the image capturing apparatus 60 includes, for example, two image capturing systems having lens units 12A and 12B, aperture units, mechanical shutter units 14A and 14B, CCDs 16A and 6B, and AFEs 18A and 18B.

The image capturing apparatus 60 further includes an image synthesizer 62 between the AFEs 18A and 18B, and the signal processor 20. Each of the AFEs 18A and 18B respectively conducts sampling of signals output from the CCDs 16A and 16B, conducts gain adjustment to the signals, and outputs digital captured-image signal (RAW-RGB data) to the image synthesizer 62.

The image synthesizer 62 is input with the digital captured-image signals corresponding to two captured-images, which are a right image and a left image captured by each of the two image capturing systems simultaneously. The image synthesizer 62 stores RAW-RGB data of the two captured-images in the SDRAM 24 temporarily.

When the image synthesizer 62 reads image data from the SDRAM 24 line by line, the image synthesizer 62 reads a left image at first and then a right image, and synthesizes the left image and the right image as one synthesis image. Then, the image synthesizer 62 outputs the left image and the right image as the one synthesis image to the signal processor 20.

For the simplicity of description, the two image capturing systems corresponds to a left image and a right image, but can correspond to an upper image and a lower image, or a right hemisphere image and a left hemisphere image for all-sky cameras. Further, two or more image capturing systems can be used to capture two or more images to be synthesized as one image.

As to the signal processor 20, the synthesis image is generated as one captured image. Similar to the first example embodiment, the ISP 44 conducts image processing to the synthesis image, the YUV converter 46 converts the synthesis image to YUV data, the re-sizing unit 48 converts a size of YUV data, and then the memory controller 52 stores the YUV data in the SDRAM 24.

FIG. 12 is a flowchart showing the steps of a process of brightness correction conductable by the signal processor 20 according to the second example embodiment. At step S401, the signal processor 20 conducts a feedback control of automatic exposure for each of the two image capturing systems.

Similar to the first example embodiment, the signal processor 20 computes an AE evaluation value based on the RAW-RGB data received by the CCD I/F 42. In the second example embodiment, RGB cumulative value for each block of a synthesis image generated by synthesizing two images captured by the two CCDs 16A and 16B is computed as the AE evaluation value.

In this configuration, among the all blocks, a cumulative value of luminance value (Y) of a left-half block becomes brightness for the left-side system, and a cumulative value of luminance value (Y) of a right-half block becomes brightness for the right-side system. In the AE processing, a feedback control of control parameters (e.g., exposure time, aperture value of aperture unit, analog gain) of exposure conditions is conducted for each of the left-side system and the right-side system so that the cumulative value of each luminance value (Y) becomes close to a suitable brightness (i.e., target value of cumulative value).

At step S402, the signal processor 20 divides a synthesis image into a left area, which is a left-half block corresponding to the left-side system, and a right area, which is a right-half block corresponding to the right-side system.

Figure 13A:
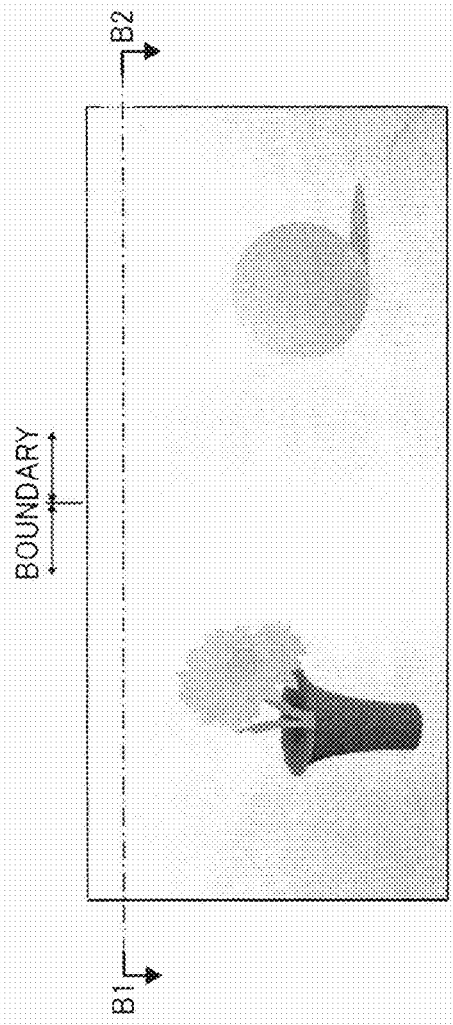
FIG. 13A is an example of a synthesis image, synthesized from images captured by two image capturing systems.

At step S403, brightness of boundary of the left area and the right area is measured. Specifically, as illustrated in FIG. 13A, luminance value of given blocks of the boundary of the left area and the right area is read. In this process, since brightness of blocks at the boundary is only required to be read, luminance value can be read when the AE control operation is conducted at step S401. The boundary can be composed of one block width in the left and right areas, but the number of blocks can be increased depending on the number of defined meshes.

Figure 13B:
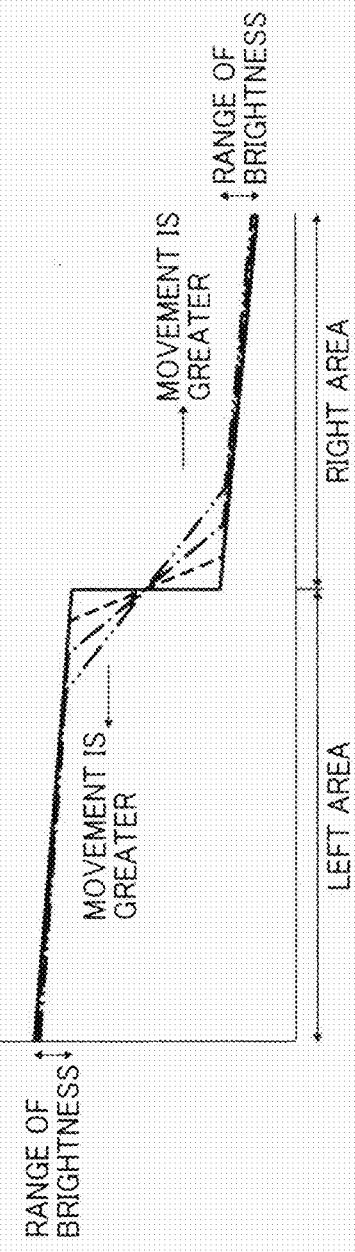
FIG. 13B is an example of profiles of brightness between B1 and B2 of the synthesis image of FIG. 13A indicated by arrows.

FIG. 13A is an example of a synthesis image, synthesized from images captured by the two image capturing systems. FIG. 13B is one dimensional profile or graph of brightness between B1 and B2 indicated by arrows in the synthesis image of FIG. 13A. The synthesis image of FIG. 13A has a left area and a right area in the one synthesis image. At step S401, AE control is conducted based on an evaluation at each of the left area and the right area.

As to the AE control at each of the systems, brightness of the entire image and the center of image are measured to determine control parameters of exposure conditions that can set brightness close to a target value. Therefore, even if brightness may be the same level for the left area, and brightness may be the same level for the right area, as indicated by a solid line in FIG. 6B, difference in brightness levels may occur at the boundary, which is a synthesized part of the images, which means luminance values of boundary blocks may have difference in brightness levels between the left area and the right area. Further, difference in brightness levels may also occur at the boundary due to fluctuation of sensitivity of the CCD 16, insufficient resolution level of AE control, or the like. Since the boundary of the two captured images is designed to match a position of the same object, the boundary should be a continuous area.

Therefore, at step S404, as indicated by a dot line, a long dashed short dashed line, and a long dashed double-short dashed line in FIG. 13B, the signal processor 20 can change an size of the boundary area between the left area and the right area used for blending the measured brightness to determine the boundary based on the measured movement. Further, in the second example embodiment, the right-side system and the left-side system are combined as one hardware, and thereby only one accelerometer can be used as the accelerometer 32.

At step S405, the signal processor 20 sets brightness correction coefficient data for each pixel based on the determined boundary and measured brightness of the determined boundary between the left area and right areas.

If difference of brightness occurs at the measured boundary blocks of the left area and right area, in the left area, brightness is adjusted from the left-end of the determined boundary to set brightness at the boundary between the left area and the right area at a middle value of brightness of the left area and the right area to set a brightness correction coefficient. In the same way, in the right area, brightness is adjusted from the right-end of the determined boundary to set brightness at the boundary between the left area and right area at a middle value of brightness of the left area and the right area to set a brightness correction coefficient.

Then, the ISP 44 conducts gain processing of brightness correction coefficient computed for each pixel to each of R, G, and B data of RAW-RGB data to conduct brightness correction. Similar to the white balance correction, a blending area of brightness can be changed depending on the amount of movement, with which difference in brightness levels can be reduced or eliminated. Then, the process ends.

In the second example embodiment that synthesizes images, only the brightness correction is described, but similar to the first example embodiment, the white balance correction can be also conducted for the second example embodiment.

The above described example embodiments can be applied to image processing apparatuses, image capturing apparatuses, image correction method, a program, and a storage medium of the program, in which time length constrain of the image correction coefficient computing process can be reduced, image correction suitable for each of a plurality of areas having different lighting conditions such as color temperature and brightness, which may be caused by artificial light such as light source and strobe or natural light such as sun light, can be conducted, and the boundary between the different areas can be reproduced with naturalness of image.

The above described example embodiments can be applied to color adjustment of each of areas having different color temperature, in which without causing the frame delay, correction of color tones suitable to each of areas corresponding to different light sources can be conducted while reducing difference of color tone at the boundary, and further, color temperature of one area corresponding to one light source, which is other than the boundary, is not affected by color temperature of another one area corresponding to another light source, which is other than the boundary. Further, the above described example embodiments can be also applied to brightness correction at a boundary between areas having different brightness when a plurality of cameras capture images and the images are connected as a synthesis image while reducing brightness fluctuation or difference at the boundary, The present invention can be implemented in any convenient form, for example using dedicated hardware, or a mixture of dedicated hardware and software. The computer software can be provided to the programmable device using any storage medium or carrier medium for storing processor-readable code such as a floppy disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), SD card, a solid state memory device or the like, but not limited these. Further, the computer software can be provided through communication lines such as electrical communication line.

Further, a part or entire of the above described functions can be performed by a programmable device (PD) such as a field programmable gate array (FPGA), or an application specific integrated circuit (ASIC), and the above described functions can be devised on the PD by downloading a circuit configuration data (e.g., bit stream data) described by hardware description language (HDL), very high speed integrated circuits (VHSIC) hardware description language (VHDL), Verilog-HDL or the like, and the data can be distributed using a storage medium.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image processing apparatus useable for correcting an image, comprising:
    an input unit to receive an input of an image;
    an area dividing unit to divide the image, input to the input unit, into a plurality of areas having different lighting conditions;
    a computing unit to compute a correction coefficient for each of the divided areas divided by the area dividing unit;
    a movement detector to detect a movement between the first image and the second image supplied from the input unit along the time line;
    a boundary determination unit to determine a boundary between the areas to which correction coefficients of each of the areas are blended based on the movement detected by the movement detector; and
    a setting unit to set image correction coefficient data for the image input to the input unit based on the boundary between the areas determined by the boundary determination unit.

2. The image processing apparatus of claim 1, further comprising:
    an evaluation unit to evaluate an evaluation value for each of a plurality of blocks composing the first image input to the input unit; and
    an image correction unit to conduct an image correction to the second image, input after the first image, based on the image correction coefficient data;
    wherein the computing unit computes a correction coefficient for each of the areas based on an evaluation value for each of the plurality of blocks of the first image.

3. The image processing apparatus of claim 2, wherein the input unit receives an input of captured image from an image capturing element based on a synchronization signal,
    wherein the image correction unit processes the captured image based on the synchronization signal.

4. The image processing apparatus of claim 1, wherein the movement detector detects a movement between the first image and the second image by conducting an image processing.

5. The image processing apparatus of claim 4, wherein the movement detector detects the movement between the first image and the second image input to the input unit based on difference between evaluation values of the blocks composing the first image and evaluation values of the corresponding blocks composing the second image.

6. The image processing apparatus of claim 1, wherein the movement detector detects a movement between the first image and the second image based on an output of a physical sensor.

7. The image processing apparatus of claim 1, wherein the movement includes an amount of movement,
    wherein the boundary determination unit determines a size of the boundary based on the amount of movement.

8. The image processing apparatus of claim 1, wherein the movement includes a direction of movement,
    wherein the boundary determination unit determines the boundary by shifting the boundary toward one of the areas divided by the area dividing unit based on the direction of movement.

9. The image processing apparatus of claim 1, wherein the setting unit sets uniform image correction coefficient data to a plurality of areas having different lighting conditions when the movement detected by the movement detector becomes a given level or more.

10. The image processing apparatus of claim 1, further comprising an image synthesizer to generate a synthesis image by connecting a plurality of captured images captured through different optical systems,
    wherein the plurality of areas having different lighting conditions corresponds to the plurality of captured images composing the synthesis image.

11. The image processing apparatus of claim 1, wherein the lighting condition that is different between the areas is color temperature, and the image correction coefficient data is white balance correction coefficient data, or
    the lighting condition that is different between the areas is brightness, and the image correction coefficient data is brightness correction coefficient data.

12. A method of correcting images by using an image processing apparatus, comprising the steps of:
    dividing an image input to the image processing apparatus into a plurality of areas having different lighting conditions;
    computing a correction coefficient for each of the divided areas divided by the dividing step;
    detecting a movement between a first image and a second image supplied along the time line;

determining a boundary between the areas to which correction coefficients of each of the areas are blended based on the movement detected by the detecting step; and setting image correction coefficient data for the input image based on the boundary between the areas determined by the determining step.

13. The method of claim 12, further comprising the steps of:

evaluating an evaluation value for each of a plurality of blocks composing the first image input to the image processing apparatus before the computing step; and conducting an image correction to the second image, input after the first image, based on the image correction coefficient data after the setting step, wherein the computing step computes a correction coefficient for each of the areas based on an evaluation value for each of the plurality of blocks of the first image input to the image processing apparatus.

14. The method of claim 13, further comprising the step of:

receiving an input of captured image from an image capturing element of the image processing apparatus based on a synchronization signal, wherein the conducting step of the image correction is a processing step of an image correction to the captured image based on the synchronization signal.

15. The method of claim 12, wherein the movement includes an amount of movement, wherein the determining step for determining the boundary includes a step of determining a size of the boundary based on the amount of movement.

16. The method of claim 12, wherein the movement includes a direction of movement, wherein the determining step for determining the boundary includes the step of determining a direction of shifting the boundary toward one of the areas based on the direction of movement.

17. The method of claim 12, further comprising the step of:

generating a synthesis image by connecting a plurality of captured images captured through different optical systems used for the image processing apparatus, wherein a plurality of areas having different lighting conditions respectively corresponds to the plurality of captured images composing the synthesis image.

18. The method of claim 12, wherein the setting step sets uniform image correction coefficient data to a plurality of areas having different lighting conditions when the movement detected by the movement detector becomes a given level or more.

19. The method of claim 12, the lighting condition that is different between the areas is color temperature, and the image correction coefficient data is white balance correction coefficient data, or the lighting condition that is different between the areas is brightness, and the image correction coefficient data is brightness correction coefficient data.

20. A non-transitory computer-readable storage medium storing a program that, when executed by a computer having a processing circuitry, causes the computer to execute a method of correcting an image by using an image processing apparatus, the method comprising the steps of:

receiving an input of an image;

dividing an image input to the image processing apparatus into a plurality of areas having different lighting conditions;

computing a correction coefficient for each of the divided areas divided by the dividing step;

detecting a movement between a first image and a second image supplied along the time line;

determining a boundary between the areas to which correction coefficients of each of the areas are blended based on the movement detected by the detecting step; and setting image correction coefficient data for the input image based on the boundary between the areas determined by the determining step.

* * * * *